(12) United States Patent
Sondrup

(10) Patent No.: US 6,350,373 B1
(45) Date of Patent: Feb. 26, 2002

(54) ADJUSTABLE DRAIN APPARATUS

(76) Inventor: Chris Sondrup, 28 W. 450 North, Lindon, UT (US) 84042

( * ) Notice: Subject to any disclaimer, the term of this patent is extended or adjusted under 35 U.S.C. 154(b) by 0 days.

(21) Appl. No.: 09/566,548

(22) Filed: May 8, 2000

(51) Int. Cl.⁷ .............................................. B01D 35/02
(52) U.S. Cl. ........................... 210/164; 210/460; 4/288; 4/695
(58) Field of Search ................................ 210/163, 164, 210/459, 460, 462; 4/288, 679, 695

(56) References Cited

U.S. PATENT DOCUMENTS

| | | | |
|---|---|---|---|
| 1,208,770 A | * 12/1916 | Gavin | |
| 1,792,345 A | * 2/1931 | Williams | 210/164 |
| 2,699,555 A | * 1/1955 | Green | 4/288 |
| 3,495,280 A | * 2/1970 | Galbiati | 4/679 |
| 4,207,632 A | * 6/1980 | Savell, Jr. et al. | 4/288 |
| 4,273,467 A | 6/1981 | Cronk | |
| 4,337,005 A | 6/1982 | LeBaron | |
| 4,879,771 A | * 11/1989 | Piskula | |
| 4,883,590 A | 11/1989 | Papp | |
| 4,964,180 A | * 10/1990 | Harbeke | 210/164 |
| 5,044,674 A | 9/1991 | Hendrickson | |
| 5,366,317 A | 11/1994 | Solimar | |
| 5,451,119 A | 9/1995 | Hondulas | |
| 5,470,172 A | 11/1995 | Wiedrich | |
| 5,496,128 A | 3/1996 | Odill | |
| 5,564,855 A | 10/1996 | Anderson | |
| 5,956,905 A | 9/1999 | Wiedrich | |

* cited by examiner

Primary Examiner—Christopher Upton
(74) Attorney, Agent, or Firm—Thorpe North & Western

(57) ABSTRACT

An drain that is adjustable in height and pitch to allow the top of the drain to conform to the pitch of the surface of a surrounding surface. The adjustable drain apparatus is positioned level with a floor therearound. Where the drain has a grate, designed to allow fluid to drain therethrough, a funnel, having an upper end coupled to the grate, and a lower end, and a ring, having an inner surface used to attach to the lower end, and an outer substantially spherical surface that allows the grate to be tilted. There is also a cavity formed therein, an upper and lower spherical surface, positioned in the cavity, designed to mate with the spherical surface of the ring, and to securely hold the ring therebetween, and a plate, positioned about the funnel, designed to be secured to the drain base and close the cavity in a way to securely hold the ring and thereby the funnel in a specific tilted position after adjustment. There is a connector coupled to the drain base and positioned below the cavity, designed to be connected to a pipe. Wherein the upper and lower spherical surfaces are mounted on an upper and lower adapter that are placed within the cavity around the ring. Additionally, the funnel has threads positioned therearound, and the ring has threads positioned on the inner surface so that the funnel can be threaded into the ring.

17 Claims, 1 Drawing Sheet

ADJUSTABLE DRAIN APPARATUS

THE FIELD OF THE INVENTION

The present invention relates generally to drains. More particularly, the present invention relates to a drain which is adjustable in height and pitch to allow the top of the drain to conform to the pitch of a surrounding surface, like a floor.

BACKGROUND ART

The following patent relates to the present invention, and is herein incorporated by reference for the supporting teachings:

U.S. Pat. No. 4,883,590, is an adjustable floor drain apparatus having an outer cylindrically shaped body with threads on the inside thereof attached to the top of a drain pipe. A cylindrical member is disposed inside of the outer body so that concrete can be poured around the cylindrical member and the concrete will not enter the outer body. An inner cylindrically shaped body having threads on the exterior thereof is provided for mating with the inside threads on the outer body whereby the inner body can be threaded into the outer body and whereby the top thereof can be adjusted up or down to conform to the height of the finished floor. A ring is adapted to engage the top of the inner body and the ring has a partially spherical surface around the lower periphery thereof which contacts the top of the inner body which also has a complementary shaped partial spherical surface thereon for providing a mating slidable joint between the ring and the inner body. A grate is disposed in a recess on the ring and an optional basket strainer can be installed under the grate.

The foregoing patent reflects the state of the art of which the applicant is aware and is tendered with a view toward discharging applicants' acknowledged duty of candor in disclosing information that may be pertinent in the examination of the application. It is respectfully stipulated, however, that this patent does not teach or render obvious applicant's claimed invention.

PROBLEMS WITH THE PRIOR ART

Drains are found in restroom facilities, and in showers which are used to drain liquids like shower water. The problem is that the prior art drains are often installed in floor surfaces that are neither level, nor flat, or are otherwise not perpendicular to the drain pipe to which the drains must connect. Drains need to be at a proper height and level with the surfaces surrounding them in order to function properly. Drains which are not properly placed relative to surrounding surfaces may pose a safety threat. Additionally, in the prior art, it has been difficult and time-consuming to properly install level drains. There is thus a need for an adjustable drain which is simple to use and which allows an installer to quickly and easily install a drain that is level with the surrounding surfaces.

SUMMARY OF THE INVENTION

It is therefore a feature of the present invention to provide a drain. More particularly, the present invention relates to a drain that is adjustable in height and pitch to allow the top of the drain to conform to the pitch of the surface of the floor.

A further feature of the invention is to provide an adjustable drain apparatus (10) to be positioned with a floor (28) therearound. The drain has a grate (12), designed to allow fluid to drain therethrough, a funnel (14), also referred to as a coupling (14), having an upper end coupled to the grate, and a lower end, and a ring (26), having an inner surface used to attach to the lower end, and an outer substantially spherical surface that allows the grate to be tilted.

Another feature of the preferred embodiment is to provide a drain base (20), having a cavity (36) formed therein, an upper and lower spherical surface (23, 25), positioned in the cavity, designed to mate with the spherical surface of the ring, and to securely hold the ring therebetween, and a plate (18), positioned about the funnel, designed to be secured to the drain base (20) and close the cavity in a way to securely hold the ring and thereby the funnel in a specific tilted position after adjustment.

Yet another feature is to provide a connector (34), coupled to the drain base and positioned below the cavity, designed to be connected to a pipe (32). The upper and lower spherical surfaces are mounted on an upper and lower adapter (22, 24) that are placed within the cavity around the ring. Additionally, the funnel has threads positioned therearound, and the ring has threads positioned on the inner surface so that the funnel can be threaded into the ring.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
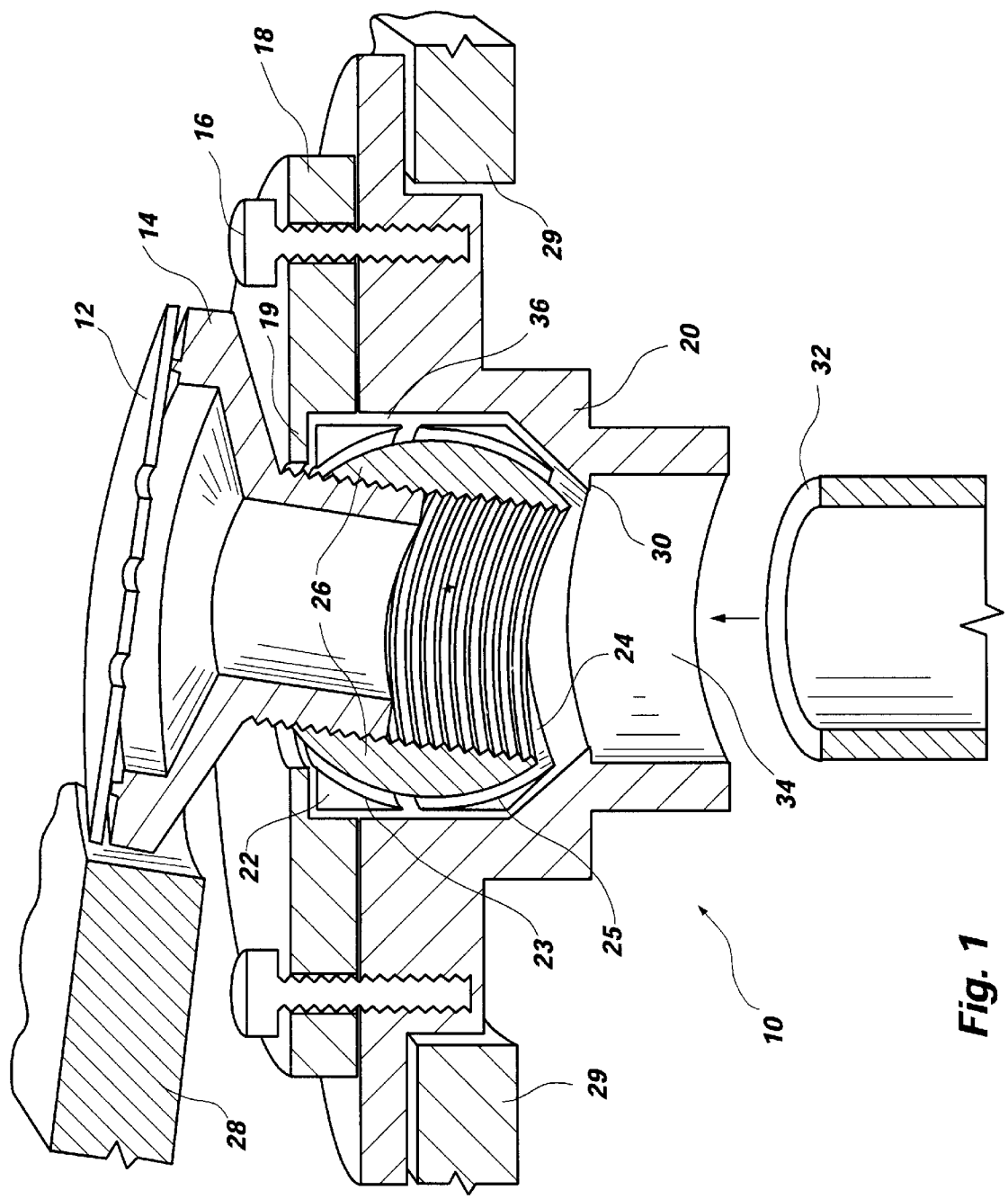
FIG. 1 is a cross sectional side view of an embodiment of the invention.

It is noted that the drawings of the invention are not so scale. The drawings are merely schematic representations, not intended to portray specific parameters of the invention. The drawings are intended to depict only selected embodiments of the invention, and therefore should not be considered to be limiting the scope of the invention. The invention will be described with additional specificity and detail through the use of the accompanying drawings. Like numbering between figures represent like elements.

DETAILED DESCRIPTION OF THE INVENTION

Referring to FIG. 1, there is a cross-sectional side view of an embodiment of the adjustable floor drain apparatus. Specifically, there is an adjustable floor drain 10, that has a surface grate ("grate") 12 that is supported by a grate support member 14 (or funnel member), which mates with threads on rounded collar or ring pivot member 26. Ring 26 rests between a circular upper adapter 22 and a lower circular adapter 24, which substantially conform to the outer spherical surface of ring 26 as illustrated. A securing ring plate 18 surrounds a portion of funnel 14, and has holes to permit securing bolts 16 to secure ring plate 18 to drain base 20. Drain base 20 has threads which mate with bolts 16, and has a central cavity to accommodate upper and lower adapter members 22 and 24, and ring 26. Drain base 20 also has a lip 30 positioned on an upper portion of coupling 34, which is designed to connect to drain pipe 32. There is also a cavity 36 located within base 20, and a lip 19 located on plate 18 for holding parts in cavity 36. The whole drain is typically mounted on a base floor (represented by base floor 29). Typically, floor tile or other items (represented by floor 28) are placed around drain 10. These tiles or floor 28 often need to be slanted toward the drain to increase liquid drainage.

The upper and lower adapters 22 and 24 have a spherical surface for easy smooth mating to the outer spherical smooth surface of ring 26.

REMARKS ABOUT THE PREFERRED EMBODIMENT

One of ordinary skill in the art of designing plumbing equipment will realize many advantages from using the preferred embodiment. A skilled artisan would appreciate that the apparatus allows for the installation of a floor drain that can be adjusted to be level with the pitch of the floor surface 28. Additionally, the use of ring 26, which, due to its spherical surface, pivots within upper and lower adapter members 22 and 24, to allow the grate 12 of the drain 10 to align with the surface of the surrounding floor 28.

One of ordinary skill would similarly appreciate the various easy methods of adjusting drain 10. For example, it is easier to adjust the angle of drain cover 12 by keeping bolts 16 loose, thus allowing pivot member 26 to be easily adjusted. Once the drain is adjusted, the bolts are then secured tight to wedge ring 26 between upper and lower adapters 22 and 24. A skilled artisan would appreciate that the drain could also be adjusted after bolts 16 have been tightened, by forcing grate 12 to the desired position. However, once the drain has been adjusted, it is obvious that the proper sealing material, like grouting or cement for example, would be placed around the grate, which would prevent further movement or adjustment of the drain.

One of ordinary skill would also appreciate the use of ring 26 and funnel member 14. Specifically, the threaded design allows for vertical adjustment by (in the case of the pictured embodiment) threading the funnel member further into or out of the ring, thus varying the vertical height of the drain and adding vertical adjustability to the drain during installation.

It is further noted that lip 30 prevents pipe 32 from being inserted too far into drain 10 and interfering with the rotation of the drain.

A skilled artisan would also know that water resistant lining material may be required around the drain. To securely install this sheet of material, one method would be to place the material between plate 18 and base 20 and then bolting through the material with bolts 16.

VARIATION OF THE PREFERRED EMBODIMENT

One skilled in the art would be capable of making many obvious design changes which would stay within the scope of the invention disclosed in this application. One such change would be to vary the size or scale of components such as the surface grate, funnel member, bolts, securing ring, drain base, adapter members, and ring pivot member used in the apparatus.

One skilled in the art would also see it obvious to use securing means other than threads on the funnel member and on the ring pivot member to affix the two parts. For example, adhesives or glues could also be used, while still allowing for vertical and pitch adjustment of the drain.

It is merely a design choice to place lips (19) on plate 18 to hold upper adapter 22 onto ring 26. However, it is an obvious modification to have no lip when cavity 36 is lower or ring 26 is smaller. It all depends upon the dimensions and sizes of the various parts.

Although the preferred embodiment illustrates that the upper and lower adapters 22 and 24 are separate items, it is contemplated to have these parts integrated into the design of the plate 18 and base 20. Specifically, redesign of base 20 could eliminate adapter 24 by designing the base with a curved surface that would smoothly fit with ring 26. Additionally, redesign of plate 18 could also eliminate adapter 22 by also designing a curved surface to smoothly mate with ring 26.

Though bolts 16 are illustrated, most any means of attaching plate 18 to base 20 will work, so long as sufficient pressure can be used to secure ring 26 in place to prevent unwanted rotation of the drain once installed into the floor.

Although drain 10 illustrates a certain surface shape, it is obvious that any shape drain can be used. The main advantage of the preferred embodiment is the installation of ring 26 to allow for angular movement or tilting. However, it is important to note that the tilting is useful to either grate 12 or to coupling 34. Specifically, coupling 34 is often not perfectly aligned with pipe 32, and the ability to tilt the coupling is a great advantage and time savings. Therefore, it is contemplated to have a level grate 12 and a tilted base 20, which is the opposite of what is illustrated in the drawing.

Numerous modifications and alternative arrangements may be devised by those skilled in the art without departing from the spirit and scope of the present invention, and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function, manner of operation, assembly, and use may be made without departing from the principles and concepts set forth herein.

What is claimed is:

1. An adjustable drain apparatus to be positioned with a floor therearound, comprising:
   a) a grate designed to allow fluid to drain therethrough;
   b) a coupling having an upper end coupled to the grate, and a lower end; and
   c) a ring having an inner surface coupled to the lower end, and an outer substantially spherical surface that allows the grate to be tilted.

2. The apparatus of claim 1, further comprising:
   a) a drain base having a cavity formed therein;
   b) an upper and lower spherical surface positioned in the cavity, designed to mate with the spherical surface of the ring, and to securely hold the ring therebetween; and
   c) a plate positioned about the coupling, designed to be secured to the drain base and close the cavity in a way to securely hold the ring and thereby the coupling in a specific tilted position after adjustment.

3. The apparatus of claim 2, further comprising a connector, coupled to the drain base and positioned below the cavity, designed to be connected to a pipe.

4. The apparatus of claim 3, wherein the upper and lower spherical surfaces are mounted on an upper and lower adapter that are placed within the cavity around the ring.

5. The apparatus of claim 2, further comprising:
   a) a lower adaptor, disposed in the cavity of the drain base, having a lower spherical surface formed thereon; and
   b) an upper adaptor, disposed in the cavity of the drain base, having an upper spherical surface formed thereon; and c) the ring being wedged between the upper and lower adaptors by the plate.

6. The apparatus of claim 1, wherein the coupling has threads positioned therearound, and the ring has threads positioned on the inner surface so that the coupling can be threaded into the ring.

7. The apparatus of claim 6, wherein the plate is secured to the drain base by bolts.

8. The apparatus of claim 1, further comprising:
   a) drain base having a cavity with the ring disposed therein; and
   b) a plate, securable to the drain base, selectively securing the ring in the cavity in a specific position.

9. An adjustable drain apparatus to be positioned with a floor therearound, comprising:
   a) a grate designed to allow fluid to drain therethrough;
   b) a coupling having an upper end coupled to the grate, and a lower end with threads formed thereabout; and
   c) a ring, attached to the coupling, having an interior surface with threads formed thereon coupled to the threads of the coupling, and having an outer substantially spherical surface; and
   d) a drain base, adjustably receiving the ring, having a cavity with a substantially spherical surface therein that matches the outer substantially spherical surface of the ring.

10. The apparatus of claim 9, further comprising:
    a plate positioned about the coupling, designed to be secured to the drain base and close the cavity in a way to securely hold the ring and thereby the coupling in a specific tilted position after adjustment.

11. The apparatus of claim 10, further comprising a connector, coupled to the drain base and positioned below the cavity, designed to be connected to a pipe.

12. The apparatus of claim 11, wherein the upper and lower spherical surfaces are mounted on an upper and lower adapter that are placed within the cavity around the ring.

13. The apparatus of claim 12, wherein the plate is secured to the drain base by bolts.

14. The apparatus of claim 9, further comprising:
    a) a lower adaptor, disposed in the cavity of the drain base between the ring and the drain base, having a lower spherical surface formed thereon; and
    b) an upper adaptor, disposed in the cavity of the drain base between the ring and the drain base, having an upper spherical surface formed thereon; and
    c) a plate, securable to the drain base, selectively securing the ring in the cavity in a specific position; and
    d) the ring being wedged between the upper and lower adaptors by the plate.

15. An adjustable drain apparatus to be positioned with a floor therearound, the apparatus comprising:
    a) a drain base configured to be coupled to a drain pipe;
    b) a cavity formed in the drain base;
    c) a spherical surface located in the cavity;
    d) a ring, adjustably disposed in the cavity of the drain base;
    e) an outer spherical surface, formed on the ring, to mate with the spherical surface of the cavity of the drain base;
    f) a plate, securable to the drain base, selectively securing the ring in the cavity in a specific position;
    g) an inner surface, formed in the ring;
    h) a coupling having an upper end and a lower end attachable to the inner surface of the ring; and
    i) a grate, coupled to the upper end of the coupling.

16. The apparatus of claim 15, wherein the inner surface of the ring is threaded, and the lower end of the coupling is threaded so that the coupling can be threaded into the ring.

17. The apparatus of claim 15, further comprising:
    a) a lower adaptor, disposed in the cavity of the drain base between the ring and the drain base, having a lower spherical surface formed thereon; and
    b) an upper adaptor, disposed in the cavity of the drain base between the ring and the drain base, having an upper spherical surface formed thereon; and
    c) the ring being wedged between the upper and lower adaptors by the plate.

* * * * *